US012235018B2

(12) United States Patent
Miyoshi

(10) Patent No.: US 12,235,018 B2
(45) Date of Patent: Feb. 25, 2025

(54) HEAT EXCHANGER AND WASHING APPARATUS INCLUDING HEAT EXCHANGER

(71) Applicant: KYOCERA Corporation, Kyoto (JP)

(72) Inventor: Haruka Miyoshi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 690 days.

(21) Appl. No.: 17/433,373

(22) PCT Filed: Feb. 26, 2020

(86) PCT No.: PCT/JP2020/007792

§ 371 (c)(1),
(2) Date: Aug. 24, 2021

(87) PCT Pub. No.: WO2020/175564

PCT Pub. Date: Sep. 3, 2020

(65) Prior Publication Data

US 2022/0170665 A1 Jun. 2, 2022

(30) Foreign Application Priority Data

Feb. 28, 2019 (JP) ................................ 2019-036108

(51) Int. Cl.

| | |
|---|---|
| ***F24H 1/10*** | (2022.01) |
| ***B08B 7/00*** | (2006.01) |
| ***H05B 3/18*** | (2006.01) |

(52) U.S. Cl.

CPC .......... *F24H 1/105* (2013.01); *B08B 7/0071* (2013.01); *H05B 3/18* (2013.01); *H05B 2203/003* (2013.01); *H05B 2203/021* (2013.01)

(58) Field of Classification Search

CPC . F24H 1/105; F24H 1/14; F24H 1/142; F24H 9/1818; F24H 9/2028; F24H 9/2071; H05B 3/18; H05B 3/0052; H05B 2203/0003; H05B 2203/021; B08B 7/0071

See application file for complete search history.

(56) References Cited

U.S. PATENT DOCUMENTS

| | | | | |
|---|---|---|---|---|
| 7,221,860 | B2 | 5/2007 | Fujimura et al. | |
| 2009/0020518 | A1* | 1/2009 | Ikeda | H05B 3/82 219/217 |
| 2013/0202279 | A1* | 8/2013 | Reichl | F24H 1/142 392/480 |
| 2015/0184890 | A1* | 7/2015 | Stebbins | F24H 15/219 219/486 |
| 2017/0138633 | A1* | 5/2017 | Hermida Domínguez | F24H 1/142 |

(Continued)

FOREIGN PATENT DOCUMENTS

| | | | |
|---|---|---|---|
| JP | 54-148945 | U | 10/1979 |
| JP | 60-10033 | A | 1/1985 |

(Continued)

*Primary Examiner* — John J Norton
(74) *Attorney, Agent, or Firm* — Volpe Koenig

(57) ABSTRACT

A heat exchanger includes a heater including a ceramic body being tubular and a heat element embedded in the ceramic body, and a water receiver being tubular. The water receiver has a first end being through a first end of the ceramic body and located inside the ceramic body. The first end of the water receiver is at least partially nearer a second end of the ceramic body than an end of the heat element nearer the first end of the ceramic body.

6 Claims, 4 Drawing Sheets

(56) References Cited

U.S. PATENT DOCUMENTS

| | | | | |
|---|---|---|---|---|
| 2017/0245324 | A1 * | 8/2017 | Nakamura ............... | H05B 3/34 |
| 2019/0342951 | A1 * | 11/2019 | Nakanishi ................ | H05B 3/46 |

FOREIGN PATENT DOCUMENTS

| | | | |
|---|---|---|---|
| JP | 2012-088031 | A | 5/2012 |
| JP | 2018-084380 | A | 5/2018 |
| KR | 10-1468724 | B1 | 12/2014 |
| WO | 2013/146777 | A1 | 10/2013 |
| WO | 2018/155037 | A1 | 8/2018 |

* cited by examiner

HEAT EXCHANGER AND WASHING APPARATUS INCLUDING HEAT EXCHANGER

FIELD

The present disclosure relates to a heat exchanger for, for example, a fluid heating apparatus, a gas heating apparatus, a powder heating apparatus, an oxygen sensor, and a soldering iron, and to a washing apparatus including the heat exchanger.

BACKGROUND

A known technique is described in, for example, Patent Literature 1.

CITATION LIST

Patent Literature

Patent Literature 1: Japanese Unexamined Patent Application Publication No. 60-10033

BRIEF SUMMARY

A heat exchanger according to one aspect of the present disclosure includes a heater including a ceramic body being tubular and having a first end being open and a second end being open and a heat element embedded in the ceramic body, and a water receiver being tubular and having a first end being open and a second end being open. The first end of the water receiver is through the first end of the ceramic body and is located inside the ceramic body. The first end of the water receiver is at least partially nearer the second end of the ceramic body than an end of the heat element nearer the first end of the ceramic body.

A washing apparatus according to one aspect of the present disclosure includes the heat exchanger described above. The washing apparatus heats, with the heater, water drawn from an external water source through the water receiver and ejects the water.

BRIEF DESCRIPTION OF DRAWINGS

The objects, features, and advantages of the present disclosure will become more apparent from the following detailed description and the drawings.

DETAILED DESCRIPTION

A known heat exchanger with the structure that forms the basis of a heat exchanger according to one or more embodiments of the present disclosure may be included in a washing apparatus and include a hollow cylindrical heater including an internal water channel, and a water feeding line for feeding water into the water channel.

The heat exchanger is to efficiently heat a heating fluid. In a heat exchanger with the structure that forms the basis of the heat exchanger according to one or more embodiments of the present disclosure, water flowing through the water channel in the heater is likely to be laminar. This may reduce the efficiency of heat exchange between the water and the heater, possibly causing inefficient heating of the water.

The heat exchanger according to an embodiment of the present disclosure will now be described with reference to the drawings.

Figure 1:
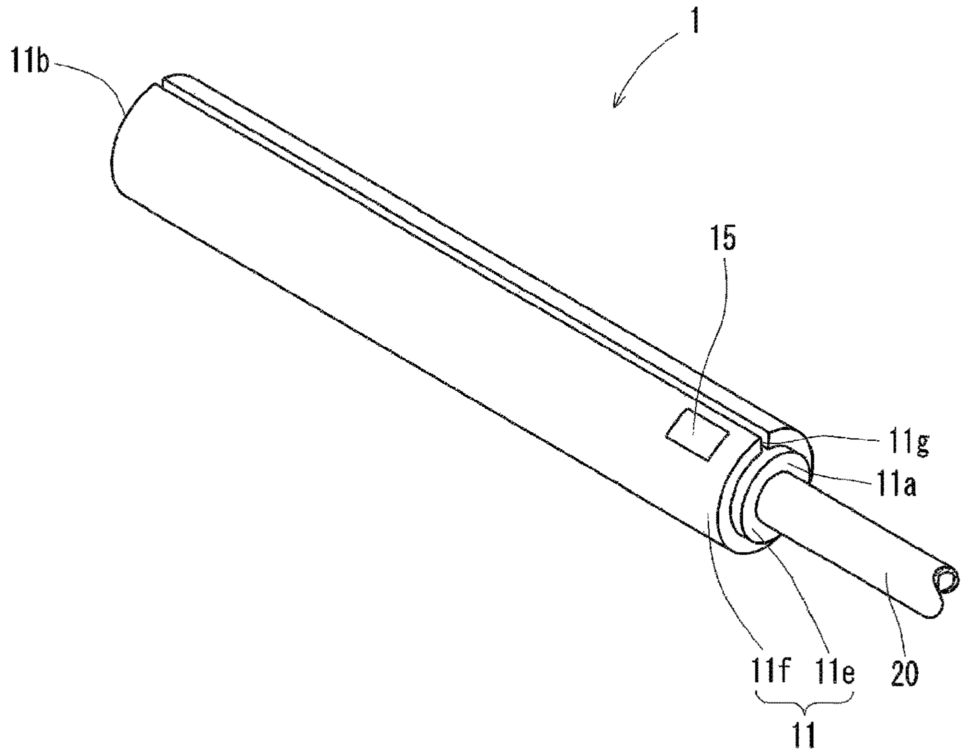
FIG. 1 is a perspective view of a heat exchanger according to an embodiment.
Figure 2:
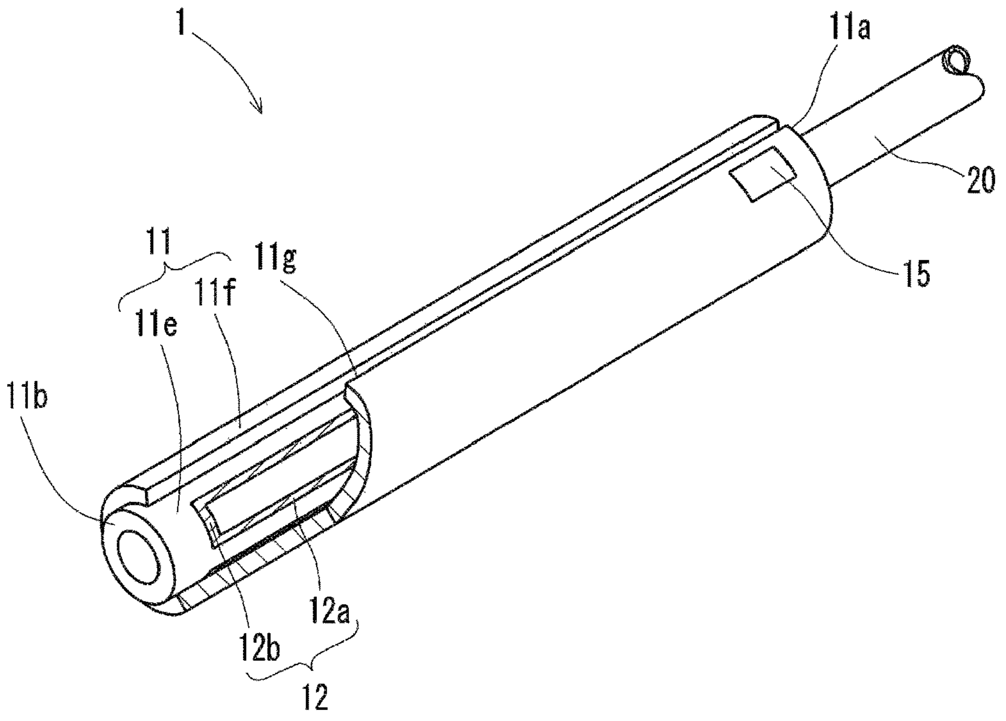
FIG. 2 is a perspective view of the heat exchanger according to the embodiment as viewed from a viewpoint different from FIG. 1.
Figure 3:
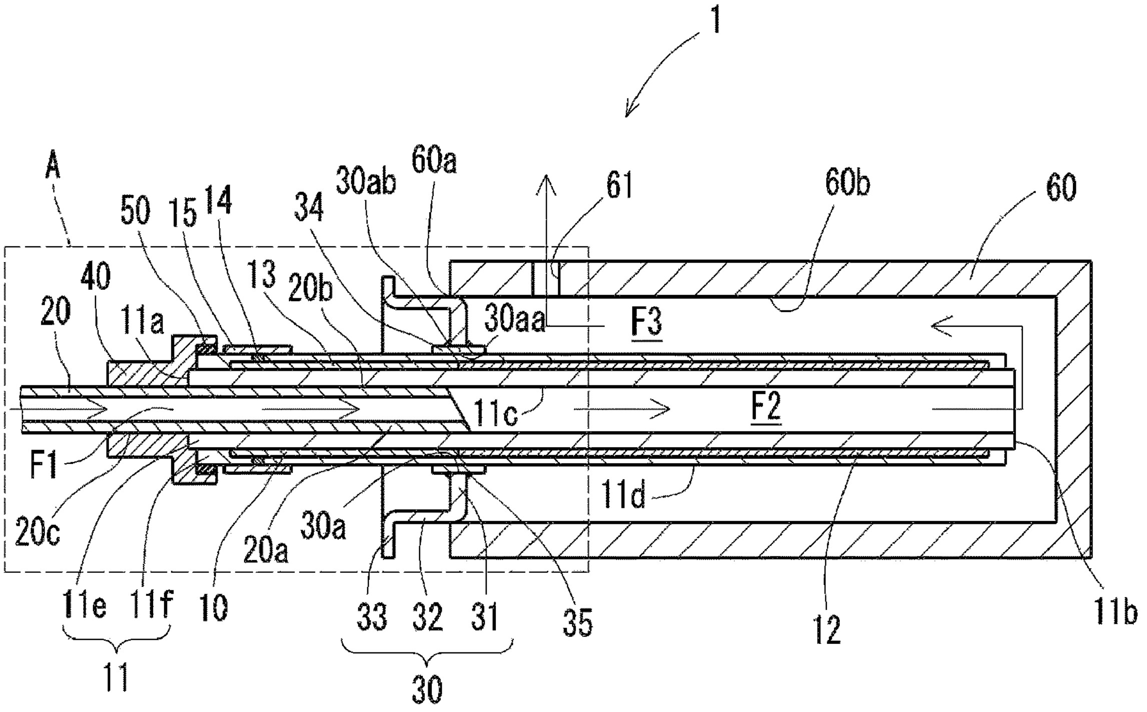
FIG. 3 is a cross-sectional view of the heat exchanger according to the embodiment.
Figure 4:
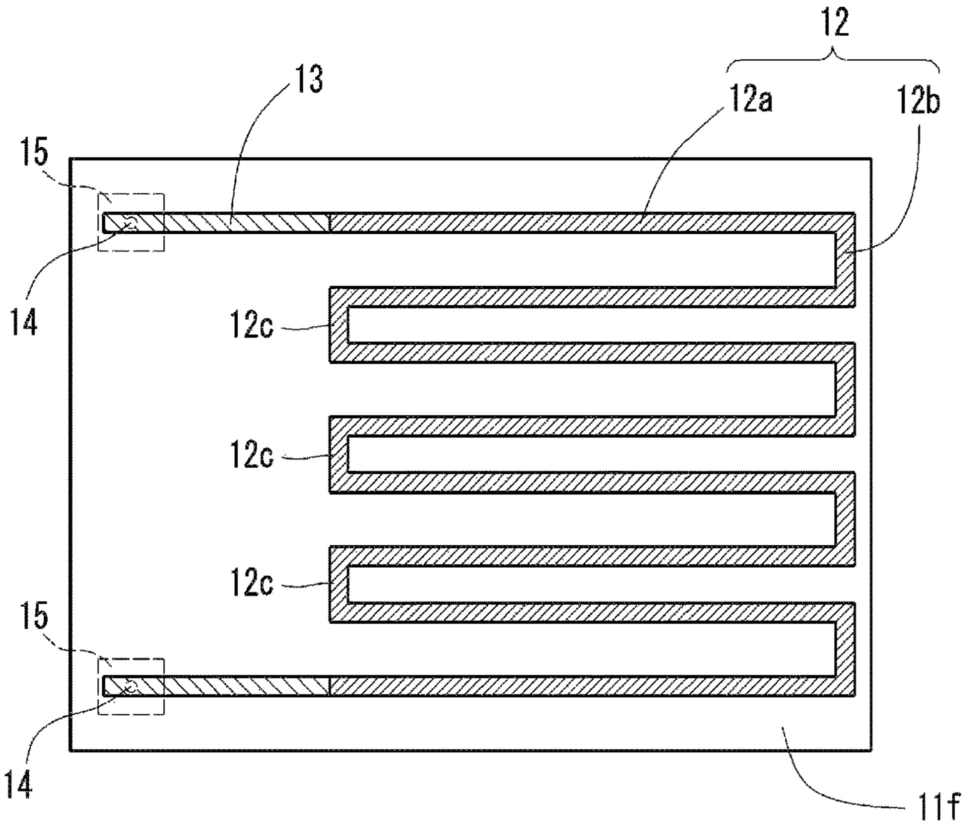
FIG. 4 is a development view of a ceramic body in the heat exchanger according to the embodiment.
Figure 5:
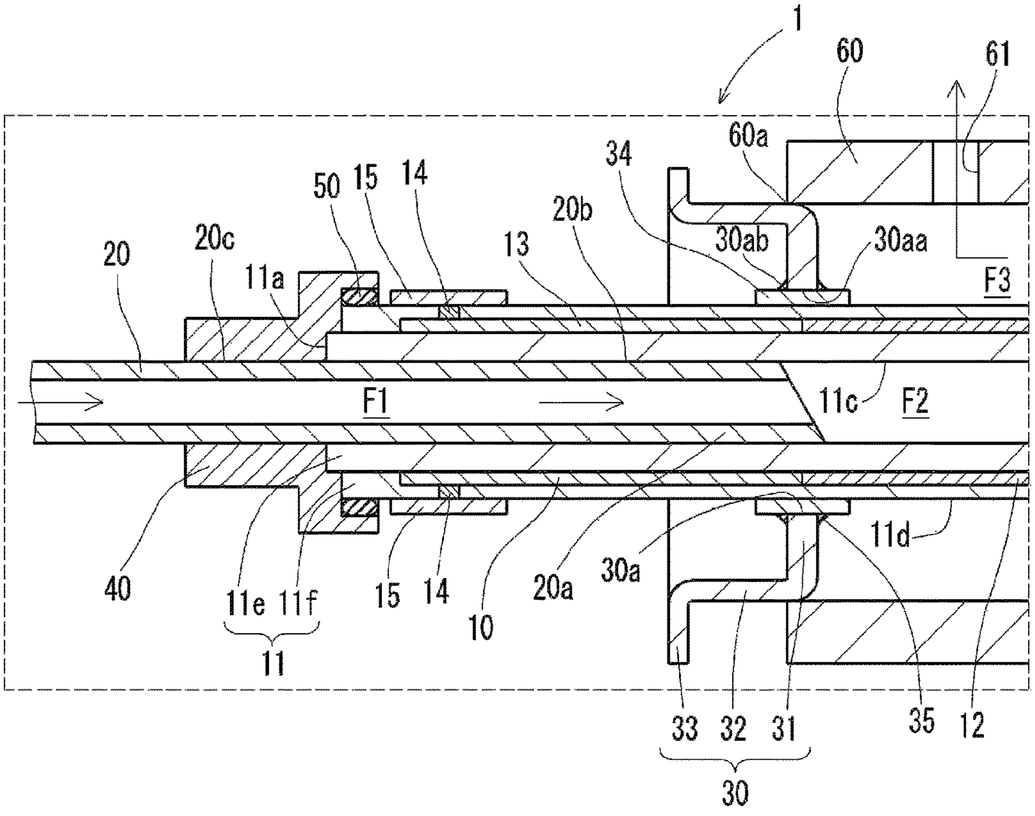
FIG. 5 is an enlarged cross-sectional view of a main part of the heat exchanger according to the embodiment.
Figure 6:
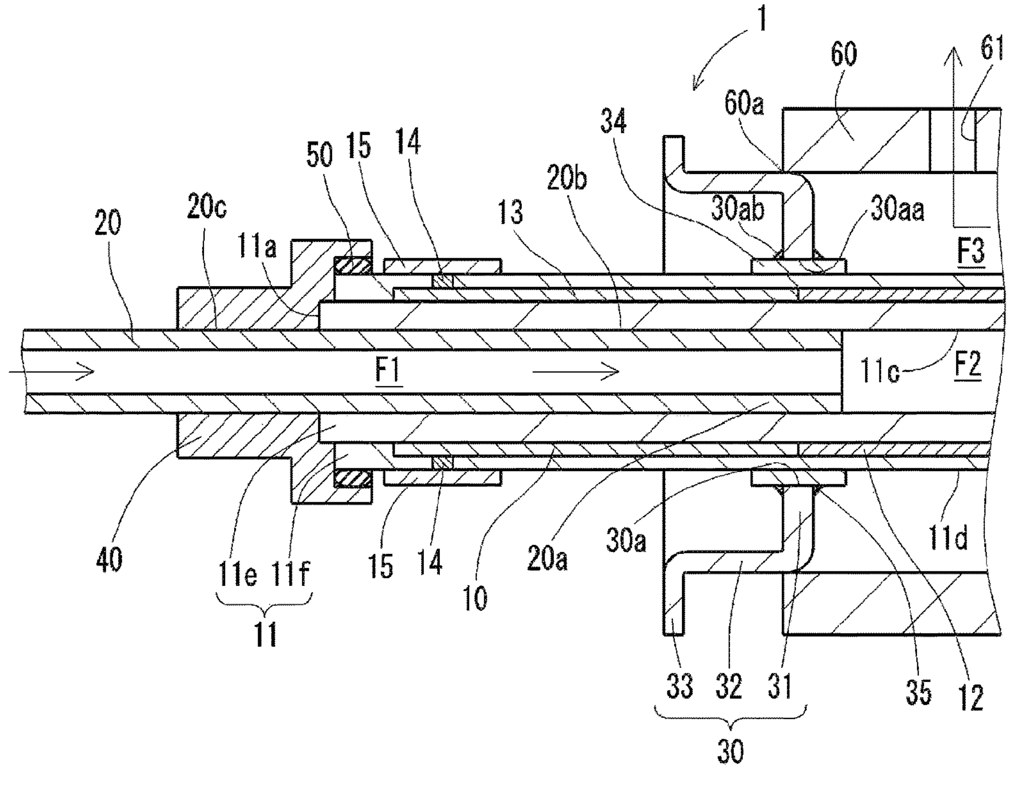
FIG. 6 is an enlarged cross-sectional view of a main part of a heat exchanger according to a modification of the embodiment.
Figure 7:
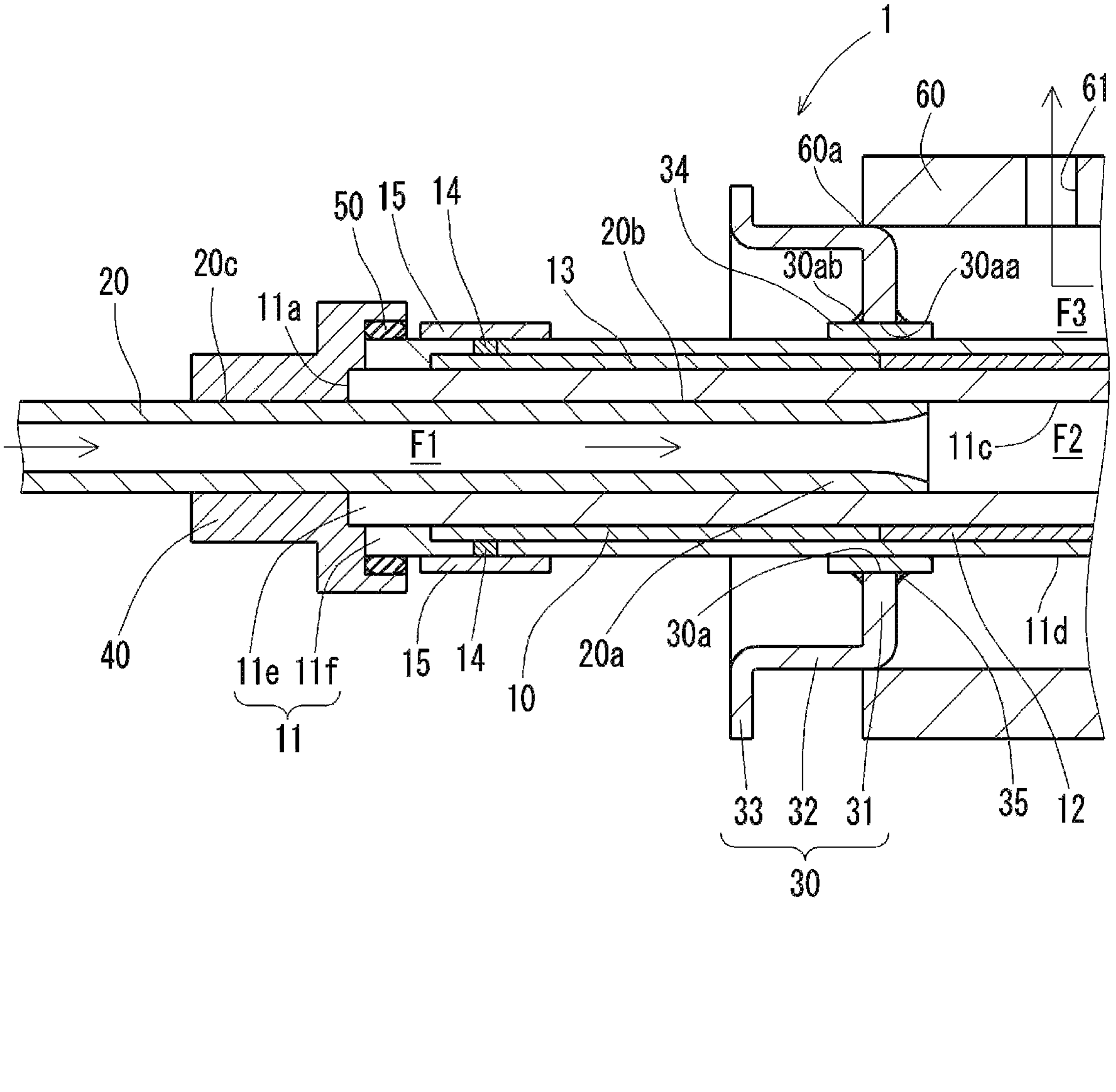
FIG. 7 is an enlarged cross-sectional view of a main part of a heat exchanger according to another modification of the embodiment.

FIG. 1 is a perspective view of the heat exchanger according to the present embodiment. FIG. 2 is a perspective view of the heat exchanger according to the present embodiment as viewed from a viewpoint different from FIG. 1. FIG. 3 is a cross-sectional view of the heat exchanger according to the present embodiment. FIG. 4 is a development view of a ceramic body in the heat exchanger according to the present embodiment. FIG. 5 is an enlarged cross-sectional view of a main part of the heat exchanger according to the present embodiment. FIG. 6 is an enlarged cross-sectional view of a main part of a heat exchanger according to a modification of the present embodiment. FIG. 7 is an enlarged cross-sectional view of a main part of a heat exchanger according to another modification of the present embodiment. FIGS. 1 and 2 show a heater and a water receiver in the heat exchanger without showing other parts of the heat exchanger. FIGS. 3 and 5 to 7 schematically show the heat exchanger. The positions of a feedthrough conductor and an electrode pad shown in FIGS. 3 and 5 to 7 may be imprecise. In FIGS. 2 and 4, a heat element and lead-out conductors are hatched. FIG. 4 is a development view of a surface of a surface layer facing a core. FIG. 5. is an enlarged cross-sectional view of area A shown in FIG. 3. Enlarged cross-sectional views shown in FIGS. 6 and 7 each correspond to the enlarged cross-sectional view of the main part shown in FIG. 5.

A heat exchanger 1 includes a heater 10 and a water receiver 20. The heater 10 includes a ceramic body 11 and a heat element 12.

The ceramic body 11 is tubular and has an open first end 11*a* and an open second end 11*b*. The ceramic body 11 may be a triangular tube, a rectangular tube, a cylinder, or an oval tube, or may have another shape. As shown in, for example, FIGS. 1 and 2, the ceramic body 11 in the heat exchanger 1 is cylindrical.

The ceramic body 11 is formed from an insulating ceramic material. Examples of the insulating ceramic material for the ceramic body 11 include alumina, silicon nitride, and aluminum nitride. Alumina may be used for its oxidation resistance and ease of manufacture. Silicon nitride may be used for its high strength, high toughness, high insulating performance, and high heat resistance. Aluminum nitride may be used for its high thermal conductivity.

At least either an inner peripheral surface 11*c* or an outer peripheral surface 11*d* of the ceramic body 11 may be coated with a coating layer formed from a metal material. The coating improves the corrosion resistance of the ceramic body 11, thus improving the durability of the heat exchanger 1. Examples of the metal material for the coating layer include silver, gold, copper, and nickel. An oxide film may be on the outer surface of the coating layer.

As shown in, for example, FIGS. 1 to 3 and 5 to 7, the ceramic body 11 includes a core 11*e* and a surface layer 11*f*.

The core 11_e_ is a cylinder having open ends. The surface layer 11_f_ is located on the outer peripheral surface of the core 11_e_. The surface layer 11_f_ may entirely or partially cover the outer peripheral surface of the core 11_e_. In the heat exchanger 1, the core 11_e_ has both ends in the axial direction of the ceramic body 11 (hereafter simply referred to as the axial direction) exposed from the surface layer 11_f_. The core 11_e_ has, for example, an entire length in the axial direction of 30 to 150 mm, an outer diameter of 10 to 20 mm, and an inner diameter of 8 to 18 mm. The surface layer 11_f_ has, for example, an entire length in the axial direction of 28 to 148 mm and a thickness of 0.2 to 1 mm.

The ceramic body 11 may have, on the outer peripheral surface 11_d_, a recess 11_g_ extending in the axial direction. As shown in, for example, FIGS. 1 and 2, the recess 11_g_ may be defined by the surface layer 11_f_ partially covering the outer peripheral surface of the core 11_e_ and the exposed portion of the outer peripheral surface of the core 11_e_. The recess 11_g_ may extend entirely or partially across the length of the surface layer 11_f_ in the axial direction.

The heat element 12 is conductive and linear or strip-shaped. The heat element 12 generates heat upon receiving a current and heats a heating fluid with the ceramic body 11 in between. The heat element 12 is embedded in the ceramic body 11 and extends between the first end 11_a_ and the second end 11_b_. As shown in, for example, FIGS. 2, 3, and 5 to 7, the heat element 12 in the heat exchanger 1 is between the core 11_e_ and the surface layer 11_f_. The heat element 12 may not be located on the exposed portions of the outer peripheral surface of the core 11_e_.

The heat element 12 is formed from a conductive material mainly containing a metal having a high melting point. The conductive material for the heat element 12 mainly contains, for example, tungsten, molybdenum, or rhenium. The heat element 12 may contain the material for the ceramic body 11. The dimensions of the heat element 12 are determined as appropriate depending on, for example, the heating temperature of the heat element 12 and a voltage applied to the heat element 12. The heat element 12 may have, for example, a width of 0.3 to 2 mm, a thickness of 0.01 to 0.1 mm, and an entire length of 500 to 5000 mm. The ceramic body 11 may contain a compound containing a metallic element contained in the heat element 12. For example, when the heat element 12 contains tungsten or molybdenum, the ceramic body 11 may contain tungsten silicide ($WSi_2$) or molybdenum disilicide ($MoSi_2$).

The heat element 12 may have a conductive pattern in which the heat element 12 is turned repeatedly between the first end 11_a_ and the second end 11_b_ of the ceramic body 11. As shown in, for example, FIGS. 2 and 4, the heat element 12 in the heat exchanger 1 has a conductive pattern in which the heat element 12 is turned repeatedly between the first end 11_a_ and the second end 11_b_ in the peripheral direction of the ceramic body 11. In other words, the heat element 12 has a meandering conductive pattern having multiple linear portions 12_a_ and multiple turns 12_b_. The linear portions 12_a_ extend in the axial direction and are parallel to one another with an interval. The turns 12_b_ extend in the peripheral direction of the ceramic body 11 as viewed in a cross section perpendicular to the axial direction. Each turn 12_b_ connects ends of adjacent linear portions 12_a_. The turns 12_b_ may be linear as shown in, for example, FIGS. 2 and 4 or curved. The cross section of the heat element 12 may be circular, oval, rectangular, or in another shape.

The heater 10 further includes lead-out conductors 13, feedthrough conductors 14, and electrode pads 15. The heat element 12 is electrically connected to an external circuit (external power source) with the lead-out conductors 13, the feedthrough conductors 14, and the electrode pads 15.

Each lead-out conductor 13 is a linear or strip member. As shown in, for example, FIGS. 3 and 5 to 7, the lead-out conductors 13 are between the core 11_e_ and the surface layer 11_f_ and extend in the axial direction. Each lead-out conductor 13 has a first end connected to the heat element 12 and a second end located nearer the first end 11_a_ of the ceramic body 11 than the first end connected to the heat element 12.

The lead-out conductors 13 are formed from, for example, a conductive material mainly containing a metal having a high melting point. The conductive material for the lead-out conductors 13 mainly contains, for example, tungsten, molybdenum, or rhenium. The lead-out conductors 13 may contain the material for the ceramic body 11.

The lead-out conductors 13 may have a lower resistance value per unit length than the heat element 12. The lead-out conductors 13 may contain a lower amount of the material for the ceramic body 11 than the heat element 12 to have a lower resistance value per unit length than the heat element 12. In some embodiments, the lead-out conductors 13 may have a larger cross-section area than the heat element 12 to have a lower resistance value per unit length than the heat element 12.

The feedthrough conductors 14 are inside the ceramic body 11 and extend in the radial direction of the ceramic body 11. The feedthrough conductors 14 in the heat exchanger 1 extend through the surface layer 11_f_ in the ceramic body 11. Each feedthrough conductor 14 has a first end face connected to the second end of the corresponding lead-out conductor 13 not connected to the heat element 12, and a second end face exposed on the outer peripheral surface 11_d_ of the ceramic body 11.

The feedthrough conductors 14 are formed from, for example, a conductive material mainly containing a metal having a high melting point. The conductive material for the feedthrough conductors 14 mainly contains, for example, tungsten, molybdenum, or rhenium. The feedthrough conductors 14 may contain the material for the ceramic body 11.

The electrode pads 15 are located on the outer peripheral surface 11_d_ of the ceramic body 11. Each electrode pad 15 covers an end face of the corresponding feedthrough conductor 14 exposed on the outer peripheral surface 11_d_. Each electrode pad 15 is joined with a lead terminal to electrically connect to an external circuit (external power source) through the lead terminal. The electrode pads 15 are formed from a conductive material containing, for example, tungsten or molybdenum. A plating layer formed from, for example, a nickel-boron alloy or gold may be on the outer surfaces of the electrode pads 15. The electrode pads 15 each have, for example, a thickness of 10 to 300 μm and a length and a width of 1 to 10 mm.

The water receiver 20 is a cylinder having open ends. The water receiver 20 draws a heating fluid, for example, water from an external source into the ceramic body 11. The ceramic body 11 has an internal space defined by the inner peripheral surface 11_c_ of the ceramic body 11. The water receiver 20 has one end (hereafter also referred to as the first end) 20_a_ placed inside the ceramic body 11 and fixed to the heater 10. The water receiver 20 may be fixed to the heater 10 with an adhesive between an outer peripheral surface 20_b_ of the water receiver 20 at the first end 20_a_ and the inner peripheral surface 11_c_ of the ceramic body 11, or with another method. The water receiver 20 has a second end, opposite to the first end 20_a_, connected to an external source of a heating fluid.

The water receiver 20 may have the outer peripheral surface 20*b* at the first end 20*a* along the entire periphery in contact with the inner peripheral surface 11*c* of the ceramic body 11. The first end 20*a* may have an end face inclined with respect to the axial direction of the ceramic body 11, as shown in, for example, FIGS. 3 and 5. The first end 20*a* may have an end face orthogonal to the axis of the ceramic body 11, as shown in, for example, FIGS. 6 and 7.

The water receiver 20 is formed from, for example, a resin material or a metal material. Examples of the resin material for the water receiver 20 include a fluororesin and a silicone resin. Examples of the metal material for the water receiver 20 include stainless steel. The water receiver 20 has, for example, an outer diameter of 8 to 18 mm and an inner diameter of 3 to 13 mm. The length of the water receiver 20 is determined as appropriate depending on the distance between the heater 10 and the external source of a heating fluid.

The heat exchanger 1 includes a heat exchange channel through which a heating fluid flows. The heat exchange channel includes a first channel F1 defined by the inner peripheral surface of the water receiver 20 and a second channel F2 defined by the inner peripheral surface 11*c* of the ceramic body 11 and having a larger cross-sectional area than the first channel F1. The second channel F2 is downstream from the first channel F1 in the flow direction of a heating fluid (from left to right in FIGS. 3 and 5 to 7). During the operation of the heat exchanger 1, streamlines of the heating fluid in the second channel F2 in a part adjacent to the first channel F1 (upstream part of the second channel F2) leave the inner peripheral surface 11*c*, allowing turbulence of the heating fluid to be more likely to occur. With turbulence, a part of the heating fluid after exchanging heat with the inner peripheral surface 11*c* flows apart from the inner peripheral surface 11*c*, and another part of the heating fluid yet to exchange heat with the inner peripheral surface 11*c* flows nearer the inner peripheral surface 11*c*. Thus, the heat distribution of the heating fluid is more likely to be uniform in the radial direction of the ceramic body 11. The heat exchanger 1 thus enables efficient heat exchange between the heating fluid and the heater 10.

In the heat exchanger 1, the first end 20*a* is at least partially located nearer the second end 11*b* of the ceramic body 11 than an end of the heat element 12 nearer the first end 11*a* of the ceramic body 11. In other words, as shown in, for example, FIGS. 3 and 5, the first end 20*a* is at least partially placed in a part inside the ceramic body 11 that reaches high temperatures due to the embedded heat element 12 during operation. The upstream part of the second channel F2 in which turbulence is likely to occur thus includes a part that reaches high temperatures during operation. The heat exchanger 1 thus enables efficient heat exchange using turbulence in a part of the heat exchange channel that reaches high temperatures. The heat exchanger 1 heats the heating fluid efficiently with lower power consumption.

As shown in FIG. 6, the entire periphery of the first end 20*a* of the water receiver 20 may be located nearer the second end 11*b* of the ceramic body 11 than an end of the heat element 12 nearer the first end 11*a* of the ceramic body 11. This structure causes turbulence in a part of the ceramic body 11 that reaches high temperatures during operation and thus enables efficient heat exchange in the part, enabling more efficient heating of the heating fluid. Thus, the heat exchanger 1 having the structure shown in FIG. 6 further reduces power consumption.

As shown in FIG. 7, the first end 20*a* of the water receiver 20 may have an inner diameter increasing toward the second end 11*b* of the ceramic body 11. This structure reduces the decrease in the flow velocity of the heating fluid caused by, for example, a pressure drop in the first channel F1. This allows the heating fluid flowing from the first channel F1 into the second channel F2 to maintain a flow velocity for effective generation of turbulence in the upstream part in the second channel F2. This structure effectively causes turbulence in a part of the ceramic body 11 that reaches high temperatures during operation and enables efficient heat exchange in the part, thus enabling more efficient heating of the heating fluid. The heat exchanger 1 having the structure shown in FIG. 7 further reduces power consumption.

The heat exchanger 1 further includes a flange 30. The flange 30 facilitates attachment of the heater 10 to an external device. The flange 30 is annular and has a hole 30*a* to receive the ceramic body 11 as shown in, for example, FIGS. 3 and 5 to 7. The flange 30 is formed from, for example, a metal material. Examples of the metal material for the flange 30 include stainless steel and an iron-nickel-cobalt alloy. Stainless steel may be used for its high corrosion resistance. The surface of the flange 30 may be coated with a plating layer mainly containing a metal such as nickel, tin, or gold to improve the corrosion resistance of the flange 30.

The flange 30 is fixed to the heater 10 with an inner peripheral surface 30*aa* of its hole 30*a* joined to the outer peripheral surface 11*d* of the ceramic body 11. As shown in, for example, FIGS. 3 and 5 to 7, the inner peripheral surface 30*aa* may be joined to the outer peripheral surface 11*d* of the ceramic body 11 with a metal layer 34 in between. The metal layer 34 is located nearer the second end 11*b* of the ceramic body 11 than the electrode pads 15 in the axial direction. Examples of the metal material for the metal layer 34 include tungsten and molybdenum.

The flange 30 may be joined to the outer surface of the metal layer 34 with a bond 35. The bond 35 may be any appropriate material that joins the flange 30 to the metal layer 34. The bond 35 may be, for example, a brazing material such as a silver brazing material and a silver-copper brazing material. A plating layer formed from, for example, nickel, tin, or gold may be on the outer surface of the metal layer 34. This improves the wettability of the metal layer 34 with the bond 35, thus increasing the bonding strength between the ceramic body 11 and the flange 30.

In the heat exchanger 1, as shown in, for example, FIGS. 3 and 5 to 7, the first end 20*a* of the water receiver 20 is at least partially located nearer the second end 11*b* than an edge 30*ab* of the inner peripheral surface 30*aa* of the hole 30*a* nearer the first end 11*a*. In other words, the first end 20*a* overlaps the inner peripheral surface 30*aa* as viewed in a direction perpendicular to the axial direction. This structure allows heat dissipation from the flange 30 to reduce the likelihood of the temperature of the first end 20*a* increasing excessively under heat generated by the heat element 12. With the water receiver 20 formed from a resin material as well, this structure reduces deformation and deterioration of the first end 20*a* under heat generated by the heat element 12, allowing reliable generation of turbulence in the second channel F2. Thus, the heat exchanger with this structure is durable and enables efficient heating of a heating fluid over a long period. More specifically, the heat element 12 meandering as shown in, for example, FIG. 4, has turns 12*b* that reach the highest temperature in the heat element 12 at ends 12*c* of the heat element 12 nearer the first end 11*a*. With this structure as well, the heat exchanger 1 reduces deterioration of the water receiver 20 under heat generated by the heat element 12. Thus, the heat exchanger 1 is durable and enables efficient heating of a heating fluid over a long period.

As shown in, for example, FIGS. 3 and 5 to 7, the flange 30 may have a first portion 31, a second portion 32, and a third portion 33. The first portion 31 stands upright and radially outward from the metal layer 34. The second portion 32 extends from the outer peripheral edge of the first portion 31 toward the first end 11*a* of the ceramic body 11. The third portion 33 extends radially outward from an end of the second portion 32 nearer the first end 11*a*. In other words, as shown in, for example, FIGS. 3 and 5 to 7, the flange 30 has two bends between its inner periphery and outer periphery as viewed in a cross section including the axis of the ceramic body 11.

As shown in, for example, FIGS. 3 and 5 to 7, the metal layer 34 may have a length in the axial direction greater than the length of the inner peripheral surface 30*aa* in the axial direction. This structure allows the bond 35 to form a meniscus extending from the metal layer 34 to the first portion 31 in the flange 30, thus increasing the bonding strength between the heater 10 and the flange 30 and improving the durability of the heat exchanger 1.

The heat exchanger 1 further includes a connection member 40 and an annular member 50. The connection member 40 is tubular and has open ends. The connection member 40 continuously covers the outer peripheral surface of a portion of the ceramic body 11 adjacent to the first end 11*a* and an outer peripheral surface 20*c* of a portion of the water receiver 20 exposed from the ceramic body 11. As shown in, for example, FIGS. 3 and 5 to 7, the connection member 40 may include multiple cylindrical members with different sizes connected coaxially with each other. The inner peripheral surface of the connection member 40 may be in contact with the outer peripheral surface 11*d* of the ceramic body 11 and the outer peripheral surface 20*c* of the water receiver 20.

The connection member 40 is formed from, for example, a metal material or a resin material. Examples of the metal material for the connection member 40 include stainless steel and an iron-nickel-cobalt alloy. Examples of the resin material for the connection member 40 include a fluororesin and a silicone resin.

The connection member 40 at the connection between the heater 10 and the water receiver 20 improves the durability of the mechanical connection between the heater 10 and the water receiver 20. The heat exchanger with this structure is durable.

The annular member 50 is an annular member (O-ring) including a resin material. The annular member 50 is between the inner peripheral surface of the connection member 40 and the outer peripheral surface 11*d* of the ceramic body 11. Examples of the resin material for the annular member 50 include a fluororesin and a silicone resin.

The annular member 50 between the ceramic body 11 and the connection member 40 reduces stress caused by the difference in thermal expansion between the ceramic body 11 and the connection member 40, thus reducing cracks in the ceramic body 11. The heat exchanger with this structure is durable.

As shown in, for example, FIGS. 3 and 5 to 7, the annular member 50 may be in contact with a portion of the outer peripheral surface 11*d* of the ceramic body 11 with no heat element 12 embedded. This structure reduces deterioration of the annular member 50 under heat generated by the heat element 12. The heat exchanger with this structure is durable and enables efficient heating of a heating fluid.

The heat exchanger 1 further includes a case 60. The case 60 is tubular and has a closed first end and an open second end. The case 60 may be a triangular tube, a rectangular tube, a cylinder, or an oval tube, or may have another shape. The case 60 in the heat exchanger 1 is cylindrical. The heater 10 and the case 60 may be arranged to have the ceramic body 11 and the case 60 being coaxial.

The case 60 is formed from a highly heat-resistant resin material. Examples of the resin material for the case 60 include a fluororesin. The case 60 has, for example, an entire length in the axial direction of 40 to 160 mm and an inner diameter of 10 to 25 mm.

The case 60 has an opening 60*a* at the open second end in which the heater 10 is held. As shown in FIGS. 3 and 5 to 7, the case 60 accommodates a portion of the ceramic body 11 nearer the first end 11*b*. As shown in FIGS. 3 and 5 to 7, the heater 10 may be held in the case 60 with the second portion 32 of the flange 30 press-fitted in the opening 60*a*. The second portion 32 may be press-fitted in the opening 60*a* with an annular member (O-ring) formed from a resin material in between.

In the heat exchanger 1, the first channel F1, the second channel F2, and a third channel F3 defined by the outer peripheral surface 11*d* of the ceramic body 11, an inner surface 60*b* of the case 60, and a surface of the flange 30 exposed inside the case 60 are connected to each other to define a channel for the heating fluid to pass through. The heating fluid exchanges heat with the heater 10 in the second channel F2 and the third channel F3. As shown in, for example, FIGS. 3 and 5 to 7, the case 60 includes an outlet 61 that allows the third channel F3 to be open outside. The outlet 61 allows ejection of the heating fluid heated by the heater 10. The outlet 61 has, for example, an inner diameter of 1 to 5 mm. As shown in, for example, FIGS. 3 and 5 to 7, the outlet 61 may be at a position in the side wall of the case 60 nearer the first end 11*a* of the ceramic body 11. This structure facilitates heat exchange between the heating fluid and the heater 10 in the third channel F3, thus enabling efficient heating of the heating fluid.

An example method for manufacturing the heat exchanger 1 will now be described. In the example described below, the ceramic body 11 is formed from alumina ceramic.

First, an alumina ceramic green sheet to be the surface layer 11*f* of the ceramic body 11 is prepared with alumina ($Al_2O_3$) as a main component and silica ($SiO_2$), calcium oxide (CaO), magnesia (MgO), and zirconia ($ZrO_2$) in a combined total amount less than or equal to 10% by mass. Predetermined patterns to be the heat element 12 and the lead-out conductors 13 are formed on the alumina ceramic green sheet. The predetermined patterns are formed by, for example, screen printing, a transfer process, or embedding a resistor. The predetermined patterns may be formed by, for example, etching a metal leaf or shaping nichrome wire into a coil and embedding the wire. Screen printing may be used for stable quality and lower manufacturing costs. The heat element 12 and the lead-out conductors 13 may be formed with different methods.

Subsequently, predetermined patterns to be the electrode pads 15 and the metal layer 34 are formed on the surface opposite to the surface of the ceramic green sheet on which the heat element 12 and the lead-out conductors 13 are formed, in the same manner as with the heat element 12 and the lead-out conductors 13. Holes for forming the feedthrough conductors 14 that electrically connect the lead-out conductors 13 and the electrode pads 15 are punched in the ceramic green sheet and filled with a conductive paste to be the feedthrough conductors 14. A conductive paste mainly containing a metal having a high melting point such as tungsten, molybdenum, and rhenium may be used for the heat element 12, the lead-out conductors 13, the feedthrough conductors 14, and the electrode pads 15.

A cylindrical alumina ceramic molded body to be the core 11*e* in the ceramic body 11 is formed by extrusion molding. The cylindrical alumina ceramic molded body is wrapped in the alumina ceramic green sheet described above. An adhesion liquid containing an alumina ceramic material having the same composition as the green sheet in a dispersed manner is then applied and stuck tightly to the molded body to obtain an integrally molded alumina body to be the ceramic body 11. The alumina ceramic green sheet may be wrapped around the alumina ceramic molded body with a predetermined area on the outer peripheral surface of the alumina ceramic molded body left uncovered with the alumina ceramic green sheet to obtain an integrally molded alumina body including a groove to be the recess 11*g*. The integrally molded alumina body is fired in a reducing atmosphere (nitrogen atmosphere) at 1500 to 1600° C. and thus shrinks to form a sintered integral alumina body (ceramic body 11).

Subsequently, the electrode pads 15 and the metal layer 34 on the ceramic body 11 are plated. The plating typically uses, for example, nickel, gold, or tin. A plating technique may be selected from, for example, electroless plating, electroplating, and barrel plating, in accordance with use.

The flange 30 may be manufactured from a stainless-steel plate, which undergoes processes such as cutting, punching, and pressing to have a shape including the first portion 31, the second portion 32, and the third portion 33, as well as the hole 30*a* to receive the ceramic body 11.

Subsequently, the ceramic body 11 is set on a fixture. The flange 30 is then positioned to have the hole 30*a* aligned with the metal layer 34 on the outer peripheral surface 11*d* of the ceramic body 11. The ceramic body 11 is then brazed using the bond 35 at about 1000° C. in a furnace with a reducing atmosphere.

Subsequently, an annular member (O-ring) formed from, for example, rubber is attached to the outer peripheral surface of the second portion 32 in the flange 30. The case 60 formed from a resin is prepared. The case 60 receives and holds the heater 10 with the annular member attached. The water receiver 20 formed from, for example, a resin material or a metal material is then placed inside the ceramic body 11. The heat exchanger 1 may be thus manufactured.

A washing apparatus according to an embodiment of the present disclosure will now be described.

The washing apparatus according to the present embodiment includes the heat exchanger 1 described above. The washing apparatus heats, with the heater 10, water drawn from an external water source through the water receiver 20 and ejects the heated water outside. The external water source may be, for example, a public water supply system. The water flows from the first channel F1 into the second channel F2 and then into the third channel F3, and is ejected through the outlet 61. While passing through the second channel F2 and the third channel F3, the water is heated by the heater 10 to a predetermined temperature. The heated water may be used for, for example, washing a part of a human body. The washing apparatus according to the present embodiment including the heat exchanger 1 heats water efficiently with lower power consumption.

The present disclosure may be implemented in the following forms.

A heat exchanger according to one aspect of the present disclosure includes a heater including a ceramic body being tubular and having a first end being open and a second end being open and a heat element embedded in the ceramic body, and a water receiver being tubular and having a first end being open and a second end being open. The first end of the water receiver is through the first end of the ceramic body and is located inside the ceramic body. The first end of the water receiver is at least partially nearer the second end of the ceramic body than an end of the heat element nearer the first end of the ceramic body.

The heat exchanger according to the above aspect of the present disclosure heats a heating fluid efficiently with lower power consumption. A washing apparatus according to one aspect of the present disclosure includes the heat exchanger described above. The washing apparatus heats water efficiently with lower power consumption.

Although the embodiments of the present disclosure have been described in detail, the present disclosure is not limited to the above embodiments, and may be modified or changed variously without departing from the spirit and scope of the present disclosure. The components described in the above embodiments may be entirely or partially combined as appropriate unless any contradiction arises.

REFERENCE SIGNS LIST

1 heat exchanger
10 heater
11 ceramic body
11*a* first end
11*b* second end
11*c* inner peripheral surface
11*d* outer peripheral surface
11*e* core
11*f* surface layer
11*g* recess
12 heat element
12*a* linear portion
12*b* turn
12*c* end
13 lead-out conductor
14 feedthrough conductor
15 electrode pad
20 water receiver
20*a* one end (first end)
20*b* outer peripheral surface
20*c* outer peripheral surface
30 flange
30*a* hole
30*aa* inner peripheral surface
30*ab* edge
31 first portion
32 second portion
33 third portion
34 metal layer
35 bond
40 connection member
50 annular member
60 case
60*a* opening
60*b* inner surface
61 outlet

The invention claimed is:

1. A heat exchanger, comprising:

a ceramic body included in a heater that has a tubular shape, wherein the ceramic body includes a first end that is open and a second end that is open and opposite the first end along a central axis that defines an upstream direction and a downstream direction;

a heat element of the heater that extends along the central axis, wherein heat element includes a fourth end that is closer to the second end and a third end that is closer to the first end;

a lead-out conductor that is connected to the third end of the heat element and extends toward the first end of the ceramic body in the upstream direction;

a water receiver being tubular and having a fifth end that is open and extends away from the first end of the ceramic body in the upstream direction, and a sixth end of the water receiver that is open and opposite to the fifth end, wherein at least a portion of the water receiver is concentric with a core of the ceramic body along the central axis with the water receiver located inside of the core of the ceramic body;

a first channel is defined by an inner peripheral surface of the water receiver, a second channel that is fluidically coupled in the downstream direction of the first channel and defined by an inner peripheral surface of the core of the ceramic body, wherein the second channel has a larger cross-sectional area than the first channel, and wherein at least part of a boundary between the first channel and the second channel is located nearer the second end with respect to the central axis than a boundary between the heat element and the lead-out conductor with respect to the central axis, and the boundary between the first channel and the second channel is inclined with respect to the central axis.

2. The heat exchanger according to claim 1, wherein the heat element has a meandering shape including a plurality of linear portions extending along the central axis of the ceramic body and a plurality of turns extending in a peripheral direction of the ceramic body.

3. The heat exchanger according to claim 1, further comprising:

a tubular connection member continuously covering an outer peripheral surface of a portion of the ceramic body adjacent to the first end of the ceramic body and an outer peripheral surface of a portion of the water receiver exposed from the ceramic body; and an annular member comprising a resin material and located between an inner peripheral surface of the tubular connection member and the outer peripheral surface of the ceramic body.

4. The heat exchanger according to claim 1, wherein the water receiver has an inner diameter that increases in the downstream direction.

5. The heat exchanger according to claim 1, wherein the sixth end of the water receiver has an end face that is inclined with respect to the central axis.

6. A washing apparatus, comprising:

the heat exchanger according to claim 1, wherein the washing apparatus is configured to heat, with the heater, water drawn from an external water source through the water receiver, and to eject the water.

* * * * *